(12) United States Patent
Lish et al.

(10) Patent No.: US 9,335,501 B1
(45) Date of Patent: May 10, 2016

(54) BREAKAWAY BUNDLED INTERLOCKING DROP FIBER

(71) Applicant: Google Inc., Mountain View, CA (US)

(72) Inventors: David Frank Lish, Burlingame, CA (US); James Mario Del Fante, Rancho Santa Margarita, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/567,415

(22) Filed: Dec. 11, 2014

(51) Int. Cl.
*G02B 6/44* (2006.01)

(52) U.S. Cl.
CPC .............. *G02B 6/4404* (2013.01); *G02B 6/441* (2013.01)

(58) Field of Classification Search
CPC .... G02B 6/4403; G02B 6/448; G02B 6/0076; G02B 6/04; G02B 6/3851; G02B 6/441; Y10T 29/49826
USPC ................................. 385/133–134, 136, 115
See application file for complete search history.

(56) References Cited

U.S. PATENT DOCUMENTS

| | | | |
|---|---|---|---|
| 4,230,898 A * | 10/1980 | Emmel | 174/32 |
| 4,356,599 A | 11/1982 | Larson et al. | |
| 5,142,745 A | 9/1992 | Setty et al. | |
| 5,905,231 A | 5/1999 | Houte et al. | |
| 6,188,822 B1 | 2/2001 | McAlpine et al. | |
| 6,356,690 B1 | 3/2002 | McAlpine et al. | |
| 6,487,200 B1 * | 11/2002 | Fraser | 370/389 |
| 6,539,151 B2 | 3/2003 | Fajardo et al. | |
| 6,546,175 B1 | 4/2003 | Wagman et al. | |
| 6,563,990 B1 | 5/2003 | Hurley et al. | |
| 6,648,279 B1 | 11/2003 | Malin et al. | |
| 6,751,382 B2 * | 6/2004 | McGarvey | 385/102 |
| 6,785,450 B2 | 8/2004 | Wagman et al. | |
| 6,847,767 B2 | 1/2005 | Hurley et al. | |
| 6,861,590 B2 | 3/2005 | Rossi | |
| 6,909,050 B1 * | 6/2005 | Bradford | 174/110 R |
| 7,206,481 B2 | 4/2007 | Quinn et al. | |
| 7,367,534 B2 | 5/2008 | Franks, Jr. | |
| 7,391,943 B2 | 6/2008 | Blazer et al. | |
| 7,574,778 B2 | 8/2009 | Marathe | |
| 7,590,320 B2 | 9/2009 | Herbst | |
| 7,672,556 B2 | 3/2010 | Keller | |
| 8,447,062 B2 * | 5/2013 | Lin | 381/384 |
| 8,515,236 B2 | 8/2013 | Abernathy et al. | |
| 2005/0254768 A1 | 11/2005 | Franks | |
| 2006/0272846 A1 | 12/2006 | Weinberger | |
| 2012/0045084 A1 | 2/2012 | Groset et al. | |
| 2012/0106906 A1 | 5/2012 | Sakabe et al. | |
| 2012/0281955 A1 | 11/2012 | Hudson et al. | |

* cited by examiner

*Primary Examiner* — Ellen Kim (74) *Attorney, Agent, or Firm* — Lerner, David, Littenberg, Krumholz & Mentlik, LLP (57) ABSTRACT

The present disclosure relates to a bundled cable system. The bundled cable system includes a first communication cable that has a first sheathing and a second communication cable that has a second sheathing. The first sheathing has a first tab and groove disposed on the first sheathing. The second sheathing has a second tab and groove disposed on a portion of the second sheathing. The bundled cable system also includes a member connecting the first sheathing to the second sheathing to form a slot between the first sheathing and the second sheathing. The slot is about the size of a third communication cable and is configured to receive the third communication cable.

16 Claims, 7 Drawing Sheets

BREAKAWAY BUNDLED INTERLOCKING DROP FIBER

CROSS-REFERENCE TO RELATED APPLICATIONS

This application is related to commonly owned co-pending U.S. application Ser. No. 14/567,465, entitled "Adjustable Clamp Sleeve for Breakaway Bundled Interlocking Drop Fiber," the disclosure of which is hereby incorporated by reference herein in its entirety.

BACKGROUND

Optical fiber cable often extends from a Network Access Point ("NAP") on a utility pole to the Network Interface Unit ("NIU") at a customer's home. In this regard, a technician may be required to run a single drop fiber optic cable from the NAP to the NIU. Since, a NAP may be capable of servicing up to 16 homes, this would require 16 individual drop fiber optic cables to be pulled through underground conduit or strung in the air on utility poles.

Moreover, utility companies may require that aerial drop fiber optic cables be connected using a lashing wire to increase the aesthetic appeal of a completed aerial plant. This may involve the use of a metal strand run from utility pole to utility pole. The strand and extra material used to lash the fiber optic cables to the strand may produce an additional load on each utility pole such that additional materials are used to support the extra load.

BRIEF SUMMARY

One aspect of the disclosure provides a bundled cable system. The bundled cable system includes a first communication cable and a second communication cable. The first communication cable has a first sheathing that includes a first tab and groove disposed on the first sheathing. The second communication cable also includes a second sheathing that has a second tab and groove disposed thereon. The bundled cable system also includes a member connecting the first sheathing to the second sheathing to form a slot. The slot may be approximately the size of a third communication cable. Further, the bundled cable system is configured such that the tabs and grooves of the first and second portions are configured to removably attach to the third communication cable that is placed in the slot.

In some examples, the communication cables may include at least one strength member configured to absorb stress and mitigate shearing of the communication cables disposed on either side of transmission cables. In other examples, there are at least two strength members such that one is disposed on either side of the fiber strands. The strength members may be made of a dielectric material. In other examples, the member connecting the first communication cable with the second communication cable allows for separation of the first communication cable from the bundled cable system.

Another aspect of the disclosure provides a cable bundle that includes a first fiber bundle and a second fiber bundle. The first fiber bundle may include a first fiber optic cable, a second fiber optic cable, and a third fiber optic cable. The first fiber optic cable may be attached to a second fiber optic cable by a first webbing to form a first slot. The second fiber optic cable may be attached to a third fiber optic cable by a second webbing to form a second slot.

The second fiber bundle may include a fourth fiber optic cable, a fifth fiber optic cable, and a third webbing attaching the fourth fiber optic cable to the fifth fiber optic cable. A third slot may be formed by the fourth fiber optic cable, the fifth fiber optic cable, and the third webbing. The cable bundle may be formed when the fourth fiber optic cable is inserted into the first slot, the second fiber optic cable is inserted into the third slot, and the fifth fiber optic cable is inserted into the second slot.

According to some examples, the first fiber optic cable includes a first sheathing that includes a first tab and groove disposed thereon. The second fiber optic cable may also include a second sheathing that has a second tab and groove located on the second sheathing. The fourth fiber optic cable may also have a fourth sheathing with a third tab and groove located thereon, such that the third tab and groove removably attaches to the first tab and groove and the second tab and groove.

In some examples, the first fiber optic cable, the second fiber optic cable, and the fourth fiber optic cable may each includes strength members disposed on either side of the communication cables. Additionally, the strength members of the first fiber optic cable, the second fiber optic cable, and the fourth fiber optic cable aligns with each other when the fourth fiber optic cable is inserted into the first slot.

Further aspects of the disclosure describe a system that includes a network access point, a plurality of network interface units, and a plurality of communication cables that each include a tab and groove disposed thereon. The plurality of communication cables interconnect the plurality of network interface units with the network access point. The system also includes a member connecting the plurality of communication cables for a portion of the distance between the plurality of network interface units and the network access point.

In some examples, a slot may be formed between the member, a first communication cable, and a second communication cable. The slot may be sized to receive a third communication cable. In other examples, each of the plurality of communication cables may include a plurality fiber strands disposed between a pair of strength members that are made of dielectric material.

DETAILED DESCRIPTION

According to at least one aspect of the present disclosure, a fiber optic cable may be connected to at least one other fiber optic cable using a webbing to form a bundled fiber cable. The individual fiber optic cables may have a plurality of tabs and grooves located on their outer sheathing. Furthermore, each individual fiber optic cable may contain a plurality of fiber strands capable of transmitting data. Each fiber optic cable may also have at least one dielectric strength member to strengthen the fiber optic cable and to absorb stress to mitigate shearing of the fiber strands. In some examples, each fiber optic cable has two strength members disposed on either side of the plurality of fiber strands.

A bundled fiber cable may include two or more fiber optic cables attached to each other via the webbing. The space between the fiber optic cables connected via the webbing may create a slot approximately the height of an individual fiber optic cable. Additionally, the each optic cable may be capable of being detached from the bundled fiber cable. The webbing may be structured to provide sufficient strength for the bundled fiber cable to be self-supporting without additional support hardware.

The bundled fiber cable may be installed on a utility pole and connect the network access point to the network interface unit located on individual customers' homes. A technician may cut the bundled fiber cable to a first length. The first length may be based on the distance from a network access point to the network interface unit that is on the customer home farthest from the network access point. The bundled fiber cable may then be securely fastened to at least one utility pole. The technician may then cut the webbing to peel back individual fiber cables from the bundled fiber cable for connection to other network interface units. The individual fiber cables may thus provide a communication channel between the network interface unit and the network access point.

Additionally, a first bundled fiber cable may be removably attached to a second bundled fiber cable to form an interlocked bundle. The interlocked bundle may be formed by inserting a fiber optic cable from the first bundled fiber cable into a slot of the second bundled fiber cable. Furthermore, a plurality of tabs and grooves of the first fiber optic cable may align with a plurality of tabs and grooves of the fiber optic cables that make up the slot to further secure the bundle. Moreover, at least one of the dielectric strength members of the first fiber optic cable may align with one of the dielectric strength members of the fiber optic cables that form the slot to provide additional strength to the interlocked bundle.

The interlocked bundle may be installed from the network access point to the network interface units in a manner similar to the one described above. In this regard, a technician may cut the first bundled fiber cable to a first length, such as from the network access point to the farthest customer home serviced by the first bundled fiber cable. Next, the technician may cut a second bundled fiber cable to a second length, such as from the network access point to the farthest customer home serviced by the second bundled fiber cable. The technician may then interlock the first bundled fiber optic cable and the second bundled fiber optic cable as described above. As noted above, the interlocking of the first bundled fiber optic cable and the second bundled fiber optic cable may include inserting a first fiber optic cable of the first bundled fiber cable into a slot formed by a second fiber optic cable and a third fiber optic cable of the second bundled fiber cable. Additionally, the second or third fiber optic cable may be inserted into a slot of the first bundled fiber cable. Furthermore, tabs and grooves of the fiber optic cables inserted into the slots may interlock with the tabs and grooves of the fiber optic cables that form the slots. The interlock bundle may be self-supporting.

After the first bundled fiber optic cable and the second bundled fiber optic cables are interlocked, a technician may secure the interlocked bundle to utility poles. Accordingly, the technician may cut individual fiber optic cables from the first bundled fiber and connect them to individual customer homes. Excess material may be cut from the individual fiber optic cables to connect the individual fiber optic cables to the network interface unit on the side of a customer's home. Accordingly, the interlocked bundle may function in some ways as a single cable in the air, as opposed to individual fiber optic cables. Thus, the interlocked bundle may provide a more aesthetically pleasing appearance than unbundled or loosely bundled individual fiber optic cables.

Figure 1:
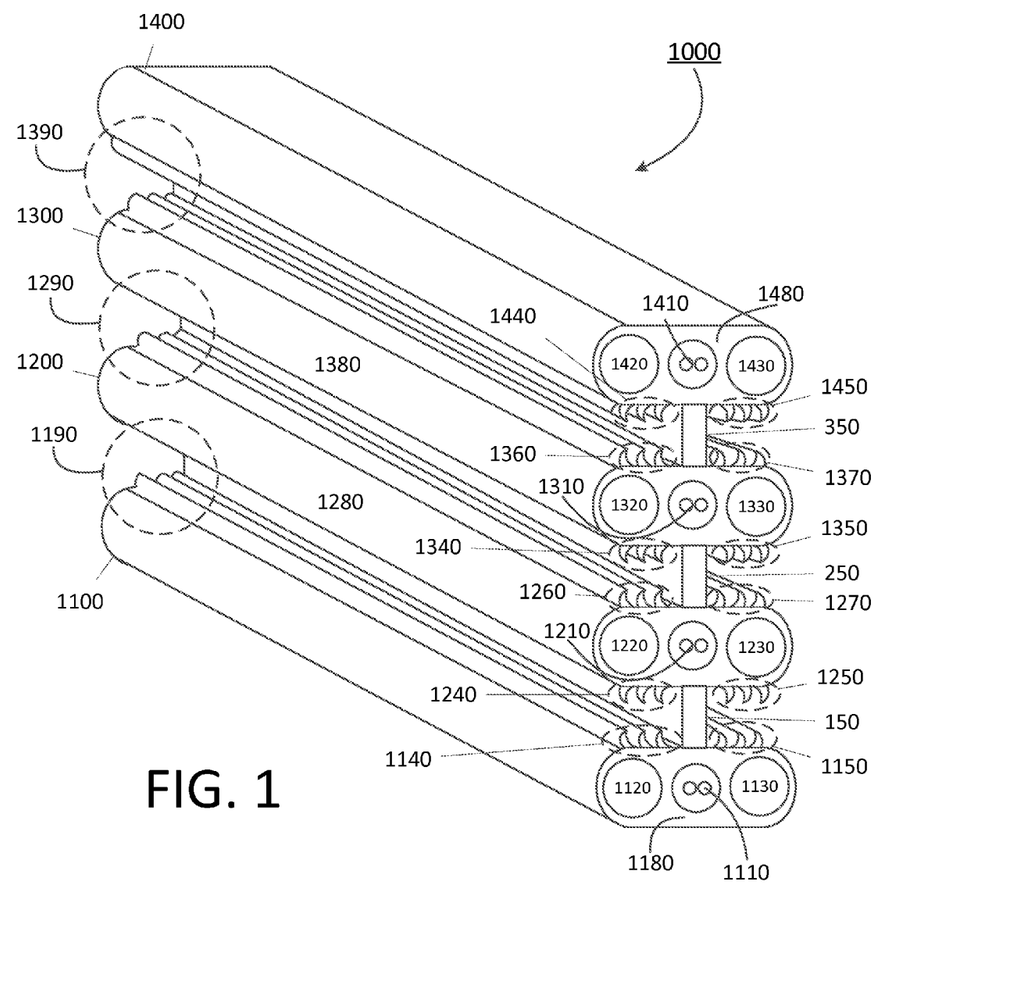
FIG. 1 is an example of a bundled fiber cable.

Turning to FIG. 1, a bundled fiber cable 1000 according to one example is shown. The bundled fiber cable 1000 may include a first fiber optic cable 1100, a second fiber optic cable 1200, a third fiber optic cable 1300, and a fourth fiber optic cable 1400. The fiber optic cables 1100, 1200, 1300, and 1400 may be similar to standard flat drop cables or slotted core ribbon fiber optic cables.

The dimensions of the bundled fiber cable may correspond with the application. For instance, in many applications, the bundled fiber cable 1000 may have a height between about 1¼ inches and about 3 inches and a width between about ¼ inch and about ½ inch. When used to connect with homes, it may be useful for the height to be about 1½ inches and about 2 inches. While such ranges may provide certain advantages in certain applications, the dimensions of the bundled fiber cable may also be larger or smaller than such ranges.

The first fiber optic cable 1100 may be attached to the second fiber optic cable 1200 by a member, such as webbing 150; the second fiber optic cable 1200 may be attached to the third fiber optic cable 1300 by webbing 250; and the third fiber optic cable 1300 may be attached to the fourth fiber optic cable 1400 by webbing 350. While four interconnected, fiber optic cables are shown in FIG. 1, other examples may include as few as two fiber optic cables interconnected by a single webbing. When used to connect homes, it may be useful for up to six fiber optic cables to be connected by five webbings.

The first fiber optic cable 1100 may include a plurality of fiber optic strands 1110, a first dielectric strength member 1120, and a second dielectric strength member 1130. Although two dielectric strength members are illustrated, fewer or more strength members may be used in each of the fiber optic cables to strengthen the fiber optic cable and to absorb stress to mitigate shearing of the fiber strands. The plurality of fiber strands 1110 may be capable of transmitting and receiving data. Further, the first dielectric strengthening member 1120 and the second dielectric strengthening member 1130 may be located on either side of the plurality of fiber optic strands 1110. The first dielectric strengthening member 1120 and the second dielectric strengthening member 1130 may be a hard resin, metal cable, or any other material capable of strengthening the fiber optic cable and absorbing stress to mitigate shearing of the fiber strands.

The plurality of fiber optic strands 1110, the first dielectric strength member 1120, and the second dielectric strength member 1130 may be encased in a first sheathing 1180. The first fiber optic cable 1100 may include a first plurality of tabs and grooves 1140 and a second plurality of tabs and grooves 1150 on the first sheathing 1180. Although three tabs are shown at tabs and grooves 1140, and although 2-4 tabs may provide certain advantages in certain applications, any number of tabs and grooves may be used. The first plurality of tabs and grooves 1140 and the second plurality of tabs and grooves 1150 may be used to interlock with tabs and grooves located on other fiber optic cables, other bundled fiber cables, or protuberances on support hardware as discussed in commonly owned co-pending application Ser. No. 14/567,465, entitled "Adjustable Clamp Sleeve for Breakaway Bundled Interlocking Drop Fiber." While the first plurality of tabs and grooves 1140 and the second plurality of tabs and grooves 1150 are illustrated on the upper surface of the fiber optic cable 1100, additional pluralities of tabs and grooves may be located on the sheathing 1180 of the first fiber optic cable 1100.

Like the first fiber optic cable 1100, the second fiber optic cable 1200 may include a plurality of fiber optic strands 1210, a first dielectric strength member 1220, and a second dielectric strength member 1230. The plurality of fiber strands 1210 may be capable of transmitting and receiving data. Additionally, the plurality of fiber strands 1210 may be disposed between the first dielectric strengthening member 1220 and the second dielectric strengthening member 1230.

A second sheathing 1280 may be used to encase the plurality of fiber optic strands 1210, the first dielectric strength member 1220, and the second dielectric strength member 1230. The second sheathing 1280 may include a first plurality of tabs and grooves 1240, a second plurality of tabs and grooves 1250, a third plurality of tabs and grooves 1260, and a fourth plurality of tabs and grooves 1270. Accordingly, each plurality of tabs and grooves may be used to interlock with another plurality of tabs and grooves located on other fiber optic cables, other bundled fiber cables, or protuberances as discussed above.

A webbing 150 may run along the longitudinal axis of the first fiber optic cable 1100 and the second fiber optic cable 1200, thereby connecting the first fiber optic cable 1100 to the second fiber optic cable 1200. The webbing 150, sheathing 1180, and sheathing 1280 may form two slots between the fiber optic cable 1100 and the second fiber optic cable 1200. For example, the first slot 1190 is shown between the first fiber optic cable 1100, the second fiber optic cable 1200, and the webbing 150. The second slot formed between the first fiber optic cable 1100, the second fiber optic cable 1200, and the webbing 150 is unlabeled. Each slot may be approximately the height of an individual fiber optic cable. In this regard, each slot may be configured to receive an fiber optic cable, as discussed in greater detail below with respect to FIGS. 5A and 5B.

The webbing 150 may be configured to facilitate cutting, such that the first fiber optic cable 1100 may be peeled away from the second fiber optic cable 1200 and/or the bundled fiber cable 1000. The webbing 150 may be the same material as the sheathings 1180, 1280 of the first fiber optic cable 1100 and the second fiber optic cable 1200. In some examples, the webbing 150 may be made of less material than the sheathings 1180, 1280, thereby allowing for separation of the first fiber optic cable 1100 and the second fiber optic cable 1200 without tearing the first sheathing 1180 and the second sheathing 1280. In other examples, the webbing 150 may be perforated to allow for easier separation of the first fiber optic cable 1100 and the second fiber optic cable 1200. Additionally, the webbing 150 may include a pattern, such as a honeycomb or a series of holes, to help in peeling the first fiber optic cable 1100 from the bundled fiber cable 1000 with or without the assistance of a cutting tool.

Similar to the first and second fiber optic cables, the third fiber optic cable 1300 may include a plurality of fiber optic strands 1310, a first dielectric strength member 1320, and a second dielectric strength member 1330. The plurality of fiber strands 1310 may be capable of transmitting and receiving data. A third sheathing 1380 may enclose the plurality of fiber optic strands 1310, the first dielectric strength member 1320, and the second dielectric strength member 1330 to form the third fiber optic cable 1300. The third sheathing 1380 may include a first plurality of tabs and grooves 1340, a second plurality of tabs and grooves 1350, a third plurality of tabs and grooves 1360, and a fourth plurality of tabs and grooves 1370.

A webbing 250 may interconnect the second fiber optic cable 1200 to the third fiber optic cable 1300. The webbing 250 may form two slots—the third slot 1290 formed on one side of the webbing 250 between the second fiber optic cable 1200 and the third fiber optic cable 1300 and the fourth slot (unlabeled) on the other side of the webbing 250 between the second fiber optic cable 1200 and the third fiber optic cable 1300.

The fourth fiber optic cable 1400 may include a plurality of fiber optic strands 1410, a first dielectric strength member 1420, and a second dielectric strength member 1430. The plurality of fiber optic strands 1410, the first dielectric strength member 1420, and the second dielectric strength member 1430 may be enclosed in a fourth sheathing 1480. The fourth sheathing 1480 may include a first plurality of tabs and grooves 1440, a second plurality of tabs and grooves 1450, a third plurality of tabs and grooves 1460, and a fourth plurality of tabs and grooves 1470.

A webbing 350 may connect the third fiber optic cable 1300 to the fourth fiber optic cable 1400. The webbing 350 may form two slots, a fifth slot 1390 and a sixth slot (unlabeled). For example, the fifth slot 1390 and the sixth slot may be bounded by the third fiber optic cable 1300, the webbing 350, and the fourth fiber optic cable 1400.

Figure 2:
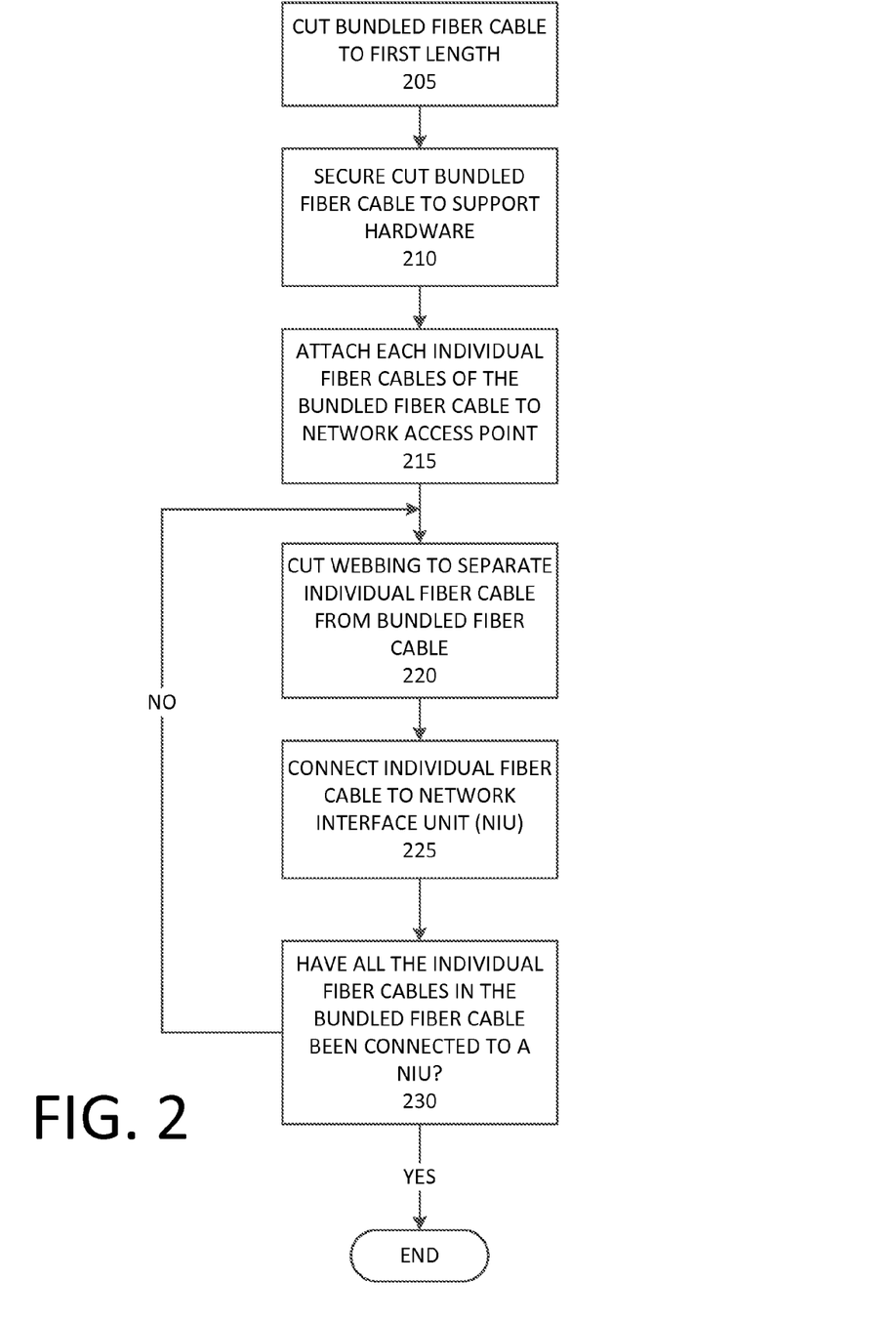
FIG. 2 illustrates a flowchart for installing the bundled fiber cable.

The bundled fiber cable 1000 may be installed on a utility pole or in an underground conduit and connect the network access point ("NAP") to the network interface unit ("NIU") located at a customer's home as shown in FIG. 2. In block 205, a technician may cut the bundled fiber cable 1000 to a first length. For example, the first length may be the distance from the NAP to the farthest NIU. The bundled fiber cable 1000 may then be securely fastened to support hardware, such as a utility pole, a span clamp, or conduit, in block 210. After securing the bundled fiber cable 1000 to support hardware, the technician may connect each individual fiber optic cable (i.e. 1100, 1200, 1300, and 1400 in FIG. 1) to individual ports in the NAP in block 215. In block 220, the technician may then cut the webbing to peel back individual fiber optic cables from the bundled fiber cable for connection to an NIU located at a customer's home. In block 225, the technician may connect the individual fiber optic cable to the NIU in the customer's home to provide fiber optic connection to the customer's home. In this regard, the individual fiber cables may provide a communication channel between the NAP and the NIU for services, such as internet, television, phone, or any combination thereof. In block 230, the technician determines whether all of the individual fiber optic cables of the bundled fiber cable have been attached to an NIU at a customer's home. If not, the method returns to block 220 to repeat the installation steps until all of the individual fiber optic cables are attached.

In some examples, the technician may connect only one individual fiber optic cable to an NIU. In this regard, the method shown in FIG. 2 would not return to block 220. Accordingly, the remaining fiber optic cables may be coiled up and secured at the utility pole or an access point in the conduit for future installation.

Figure 3:
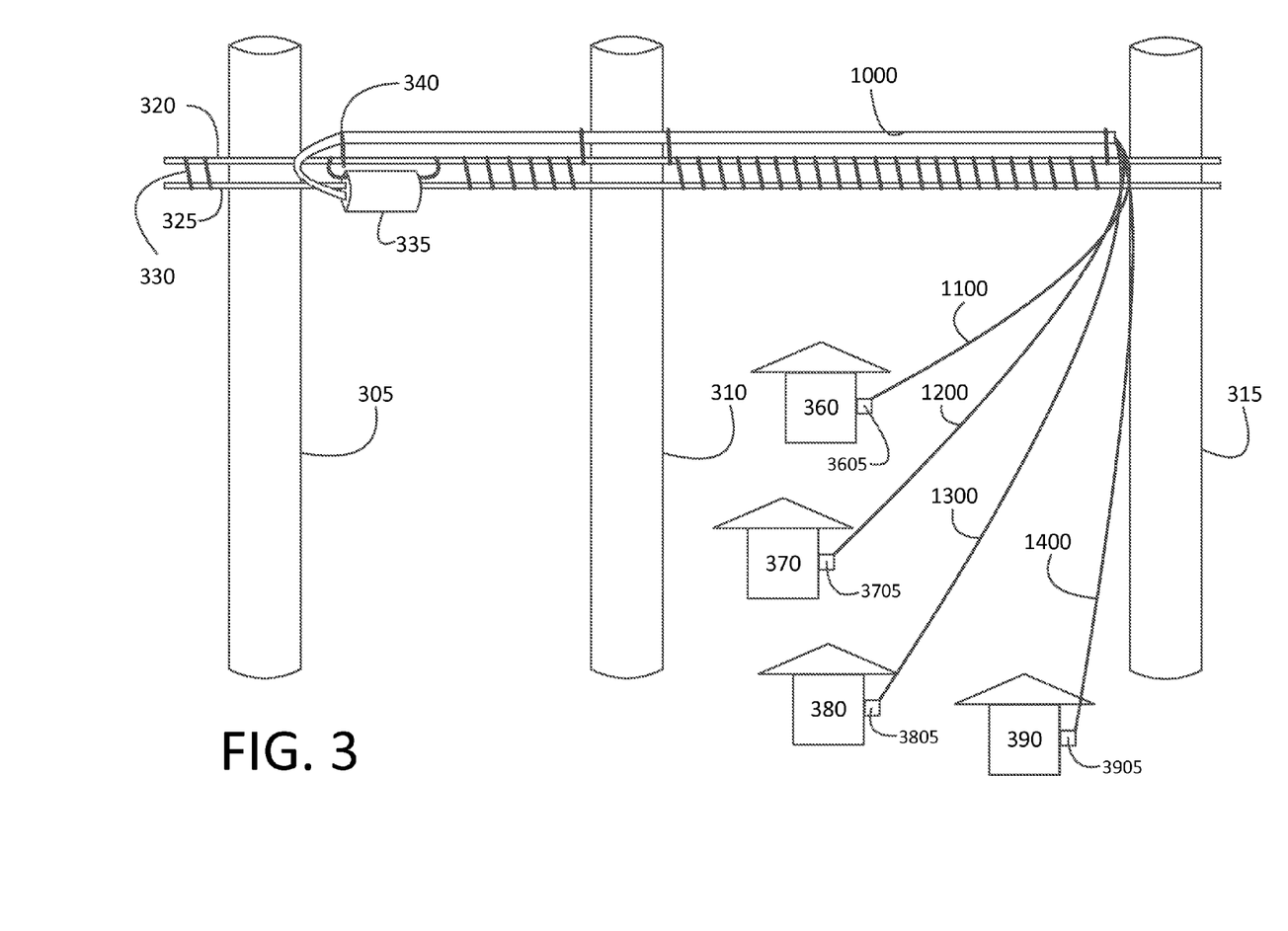
FIG. 3 shows an example of installed bundled fiber cable.

FIG. 3 illustrates one example of an installed bundled fiber optic cable 1000. In this regard, FIG. 3 includes a first utility pole 305; a second utility pole 310; a third utility pole 315; a first house 360; a second house 370; a third house 380; and a fourth house 390. Each house may have a network interface unit (NIU). For example, the first house 360 has a first NIU 3605, the second house 370 has a second NIU 3705, the third house 380 has a third NIU 3805, and the fourth house 390 has a fourth NIU 3905.

A support strand 320 is connected to each of the first utility pole 305, the second utility pole 310, and the third utility pole 315. A fiber optic cable 325 that provides connectivity to the network access point (NAP) 335 may be connected to the support strand 320 via fiber optic support hardware 330. The fiber optic support hardware 330 may include, for example, a J-hook, a drop-wire clamp, a span clamp, or any combination thereof. Additionally, the NAP 335 may be connected to the support strand 320 or a utility pole. A bundled fiber cable 1000 may be connected to NAP 335 and secured to the support strand 320 using bundled fiber cable support hardware 340, such as a J-hook, a drop-wire clamp, a span clamp, or any combination thereof. The bundled fiber cable 1000 may include a first fiber optic cable 1100, a second fiber optic cable 1200, a third fiber optic cable 1300, and a fourth fiber optic cable 1400. In this regard, each fiber optic cable of the bundled fiber cable 1000 may connect the NIU at the customer home to the NAP located on the support strand or utility pole.

For example, the house 390 in FIG. 3 may be considered the farthest from the NAP 335. A technician may begin by cutting the bundled fiber cable 1000 to a predetermined length from the NAP 335 to the NIU 3905. The technician may then secure the bundled fiber cable 1000 to the utility poles 305, 310, and/or 315, the support strand 320, or a combination of both. After the bundled fiber cable 1000 has been secured, the technician may cut the webbing connecting the fourth fiber optic cable 1400 and the third fiber optic cable 1300. The fourth fiber optic cable 1400 may then be separated from the third fiber optic cable 1300 and the rest of the bundled fiber cable 1000, for example, by peeling the fiber optic cable 1400 away from the group. Accordingly, the fiber optic cable 1400 may connect the NIU 3905 to the NAP 335 to provide a communication channel for the customer home 390.

The process may be repeated for the remaining homes. For example, the webbing between the third fiber optic cable 1300 and the second fiber optic cable 1200 may be cut. The third fiber optic cable 1300 may be peeled from the second fiber optic cable 1200 and the bundled fiber cable 1000. The fiber optic cable 1300 may then be connected to the NIU 3805, thereby providing a communication channel between the customer home 380 and the NAP 335.

Similarly, the webbing between the second fiber optic cable 1200 and the first fiber optic cable 1100 may be cut. The second fiber optic cable 1200 may be detached from the first fiber optic 1100. Accordingly, the second fiber optic cable 1200 may be connected to the NIU 3705 to provide a communication channel to the house 370. Additionally, the first fiber optic cable 1100 may be connected to the NIU 3605, such that a communication channel for home 360 is established between NIU 3605 and NAP 305. The aesthetics of the aerial plan may thus appear that of a single wire rather than individual fiber cables lashed to the support strand.

Figure 4:
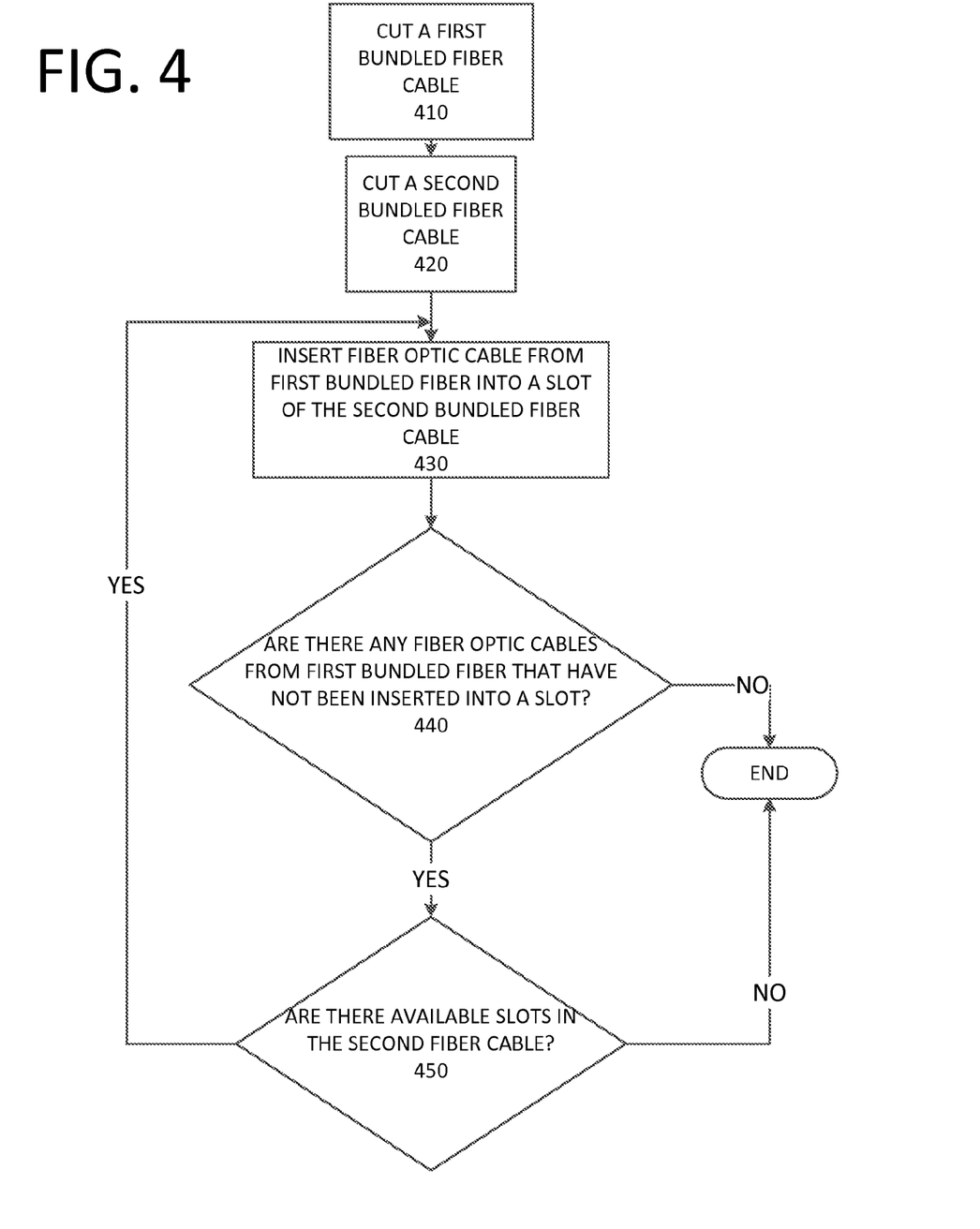
FIG. 4 illustrates a flowchart for creating an interlocked bundle.

Additionally, multiple bundled fiber cables may be interconnected when secured to utility poles or a support strand to simplify the aesthetic appearance of the aerial plant. Turning to FIG. 4, a flowchart for interconnecting two bundled fiber cables to form an interlocked bundle is shown. In block 410, a first bundled fiber cable may be cut to a first predetermined length. For example, the first bundled fiber may be cut to a length equal to the distance from the network access point to the farthest house to be serviced by the first bundled fiber cable. In block 420, a second bundled fiber cable may be cut to a second predetermined length. For instance, a length from the network access point to the farthest location from the network access point to be serviced by the second bundled fiber cable. In block 430, the interlocked bundle may be formed by inserting a fiber optic cable from the first bundled fiber cable into a slot of the second bundled fiber cable. According to some examples, a plurality of tabs and grooves of the first fiber optic cable may removably connect with a plurality of tabs and grooves of the fiber optic cables that make up the slot to create a more secure interconnection.

In block 440, the method determines whether there are any fiber optic cables from the first bundled fiber that have not been inserted into a slot. If all the fiber optic cables of the first bundled fiber cable have been inserted into slots, then the method ends in block 460. However, if there are fiber optic cables from the first bundled fiber cable that have not been inserted into a slot, the method proceeds to block 450.

In block 450, the method determines whether the second bundled fiber cable has any available slots. If there are no available slots, the method ends in block 460. However, if there are available slots in the second bundled fiber cable, then the method returns to step 430 so that the available fiber optic cables may be inserted into available slots.

Figure 5A:
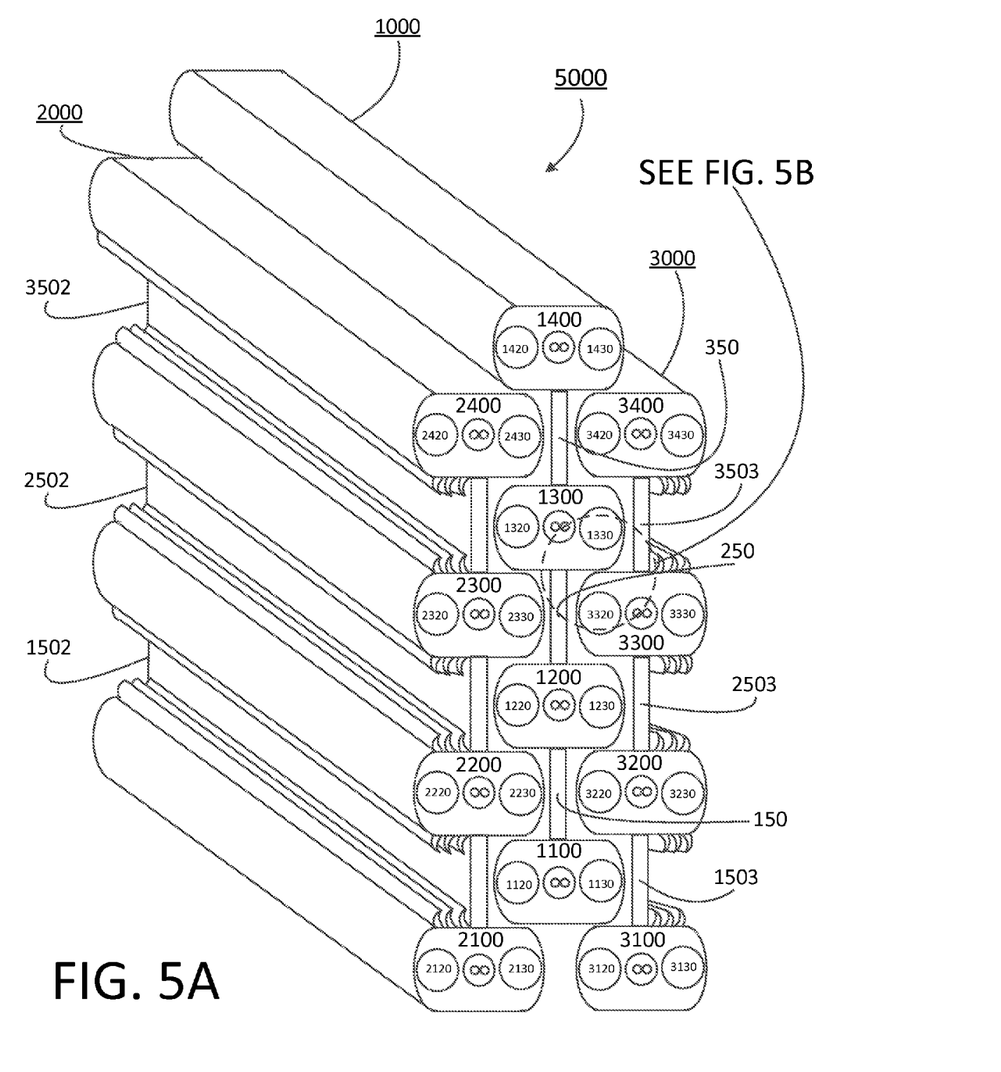
FIGS. 5A and 5B show examples of an interlocked bundle.
Figure 5B:
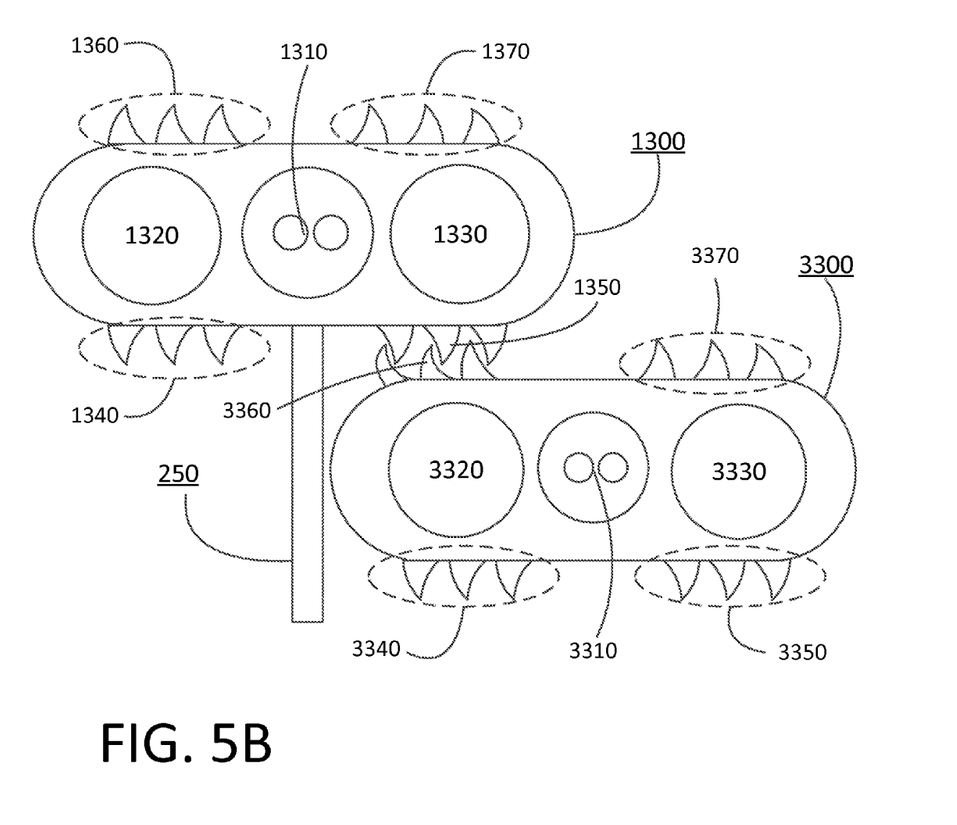

Turning to FIGS. 5A and 5B, an example of an interlocked bundle 5000 is shown. The interlocked bundle 5000 includes a first bundled fiber cable 1000, a second bundled fiber cable 2000, and a third bundled fiber cable 3000. While FIG. 5A shows three bundled fiber cables forming the interlocked bundle 5000, additional bundled fiber cables may be added.

By attaching a second bundled fiber cable 2000 to first bundled fiber cable 1000, the resultant interlocked bundle may include a fifth fiber optic cable 2100, a sixth fiber optic cable 2200, a seventh fiber optic cable 2300, and a eighth fiber optic cable 2400.

The second bundled fiber cable 2000 may be compared to the first bundled fiber cable 1000. In this regard, the fifth fiber optic cable 2100 may be attached to the sixth fiber optic cable 2200 by a webbing 1502; the sixth fiber optic cable 2200 may be attached to the seventh fiber optic cable 2300 by a webbing 2502; and the seventh fiber optic cable 2300 may be attached to the eighth fiber optic cable 2400 by a webbing 3502.

The fifth fiber optic cable 2100 may include a plurality of fiber optic strands, a first dielectric strength member 2120, and a second dielectric strength member 2130. The plurality of fiber optic strands, the first dielectric strength member 2120, and the second dielectric strength member 2130 may be encased in a fifth sheathing. The fifth fiber optic cable 2100 may include a first plurality of tabs and grooves and a second plurality of tabs and grooves on the fifth sheathing. The first plurality of tabs and grooves and the second plurality of tabs and grooves may be used to interconnect with tabs and grooves located on the first fiber optic cable 1100 as discussed in greater detail below with respect to FIG. 5B.

The sixth fiber optic cable 2200 may include a plurality of fiber optic strands, which are capable of transmitting and receiving data, a first dielectric strength member 2220, and a second dielectric strength member 2230. A sixth sheathing may be used to encase the plurality of fiber optic strands, the first dielectric strength member 2220, and the second dielectric strength member 2230. The sixth sheathing may include a first plurality of tabs and grooves, a second plurality of tabs and grooves, a third plurality of tabs and grooves, and a fourth plurality of tabs and grooves.

A webbing 1502 may connect the fifth fiber optic cable 2100 to the sixth fiber optic cable 2200. The webbing 1502 may form two slots between the fiber optic cable 2100 and the second fiber optic cable 2200. For example, each slot may be configured to receive an fiber optic cable. Turning to FIG. 5A, the first fiber optic cable 1100 may be placed in the slot formed by the fifth fiber optic cable 2100, the sixth fiber optic cable 2200, and the webbing 1502.

The seventh fiber optic cable 2300 may include a plurality of fiber optic strands, a first dielectric strength member 2320, and a second dielectric strength member 2330. A seventh sheathing may enclose the plurality of fiber optic strands, the first dielectric strength member 2320, and the second dielectric strength member 2330 to form the seventh fiber optic cable 2300. The seventh sheathing may include a first plurality of tabs and grooves, a second plurality of tabs and grooves, a third plurality of tabs and grooves, and a fourth plurality of tabs and grooves.

The sixth fiber optic cable 2200 may be attached to the seventh fiber optic cable 2300 by webbing 2502. The webbing 2502 may form two slots—one on each side of the webbing 2502 between the sixth fiber optic cable 2200 and the seventh fiber optic cable 2300.

The eighth fiber optic cable 2400 may include a plurality of fiber optic strands, a first dielectric strength member 2420, and a second dielectric strength member 2430. The plurality of fiber optic strands, the first dielectric strength member 2420, and the second dielectric strength member 2430 may be enclosed in an eighth sheathing. The eighth sheathing may include a first plurality of tabs and grooves, a second plurality of tabs and grooves, a third plurality of tabs and grooves, and a fourth plurality of tabs and grooves.

The seventh fiber optic cable 2300 may be connected to the eighth fiber optic cable 2400 by a webbing 3502. The webbing 3502 may form two slots. For example, each slot may be bounded by the seventh fiber optic cable 2300, the webbing 3502, and the eighth fiber optic cable 2400. For example, FIG. 5A shows the third fiber optic cable 1300 inserted in the slot formed by the seventh fiber optic cable 2300, the eighth fiber optic cable 2400 and the webbing 3502.

To form an interlocked bundle between the first bundled fiber cable 1000 and the second bundled cable 2000, the fiber optic cables of the first bundled fiber cable may be inserted into the slots of the second bundled fiber cable and vice versa. For example, the first fiber optic cable 1100 may be inserted into the slot formed by the fifth fiber optic cable 2100, the sixth fiber optic cable 2200, and the webbing 1502; the second fiber optic cable 1200 may be inserted into the slot formed by the sixth fiber optic cable 2200, the seventh fiber optic cable 2300, and the webbing 2502; and the third fiber optic cable 1300 may be inserted into the slot formed by the seventh fiber optic cable 2300, the eight fiber optic cable 2400, and the webbing 3502. Further, the sixth fiber optic cable 2200 may be inserted into the slot formed by the first fiber optic cable 1100, the second fiber optic cable 1200, and the webbing 150; the seventh fiber optic cable 2300 may be inserted into the slot formed by the second fiber optic cable 1200, the third fiber optic cable 1300, and the webbing 250; and the eighth fiber optic cable 2400 may be inserted into the slot formed by the third fiber optic cable 1300, the fourth fiber optic cable 1400, and the webbing 350. Furthermore, at least one of the dielectric strength members of each of the fiber optic cables may align with other dielectric strength members of other fiber optic cables. For example, as shown in FIG. 5A, the dielectric strength members 1420, 2430, 1320, 2330, 1220, 2230, 1120, and 2130 may be in the same plane. This helps to improve the strength and stability of the interlocked bundle when the interlocked bundle is secured to utility poles. Moreover, the plurality of tabs and grooves located on the sheathing of each of the fiber optic cables may be removably connected to form a more secure interconnection as discussed in greater detail below with respect to FIG. 5B. Thus, an interlocked bundle is formed from the first bundled fiber cable 1000 and the second bundled fiber cable 2000.

The third bundled fiber cable 3000 may be compared to the first bundled fiber cable 1000 and may include a ninth fiber optic cable 3100, a tenth fiber optic cable 3200, an eleventh fiber optic cable 3300, and a twelfth fiber optic cable 3400. The ninth fiber optic cable 3100 may be connected to the tenth fiber optic cable 3200 by a webbing 1503; the tenth fiber optic cable 3200 may be attached to the eleventh fiber optic cable 3300 by a webbing 2503; and the eleventh fiber optic cable 3300 may be attached to the twelfth fiber optic cable 3400 by a webbing 3503.

The ninth fiber optic cable 3100 may include a plurality of fiber optic strands, a first dielectric strength member 3120, and a second dielectric strength member 3130. The plurality of fiber optic strands, the first dielectric strength member 3120, and the second dielectric strength member 3130 may be encased in a ninth sheathing. The ninth fiber optic cable 3100 may include a first plurality of tabs and grooves and a second plurality of tabs and grooves on the ninth sheathing.

The tenth fiber optic cable 3200 may include a plurality of fiber optic strands, a first dielectric strength member 3220, and a second dielectric strength member 3230. A tenth sheathing may be used to encase the plurality of fiber optic strands, the first dielectric strength member 3220, and the second dielectric strength member 3230. The tenth sheathing may include a first plurality of tabs and grooves, a second plurality of tabs and grooves, a third plurality of tabs and grooves, and a fourth plurality of tabs and grooves. As shown in FIG. 5A, the tenth fiber optic cable 3200 may be inserted into a slot formed by the first fiber optic cable 1100, the second fiber optic cable 1200, and the webbing 150.

The ninth fiber optic cable 3100 may be attached to the tenth fiber optic cable 3200 by a webbing 1503. The webbing 1503 may form two slots between the ninth fiber optic cable 3100 and the tenth fiber optic cable 3200. Turning to FIG. 5A, the first fiber optic cable 1100 may be placed in the slot formed by the ninth fiber optic cable 3100, the tenth fiber optic cable 3200, and the webbing 1503.

The eleventh fiber optic cable 3300 may include a plurality of fiber optic strands, a first dielectric strength member 3320, and a second dielectric strength member 3330. A eleventh sheathing may enclose the plurality of fiber optic strands, the first dielectric strength member 3320, and the second dielectric strength member 3330 to form the eleventh fiber optic cable 3300. The eleventh sheathing may include a first plurality of tabs and grooves, a second plurality of tabs and grooves, a third plurality of tabs and grooves, and a fourth plurality of tabs and grooves.

The tenth fiber optic cable 3200 may be connected to the eleventh fiber optic cable 3300 by a webbing 2503. The webbing 2503 may form two slots—one on each side of the webbing 2503 between the tenth fiber optic cable 3200 and the eleventh fiber optic cable 3300.

The twelfth fiber optic cable 3400 may include a plurality of fiber optic strands for sending and receiving data, a first dielectric strength member 3420, and a second dielectric strength member 3430. The plurality of fiber optic strands, the first dielectric strength member 3420, and the second dielectric strength member 3430 may be enclosed in an twelfth sheathing. The twelfth sheathing may include a first plurality of tabs and grooves, a second plurality of tabs and grooves, a third plurality of tabs and grooves, and a fourth plurality of tabs and grooves.

A webbing 3503 may attach the eleventh fiber optic cable 3300 to the twelfth fiber optic cable 3400. The webbing 3503 may form two slots. For example, each slot may be bounded by the eleventh fiber optic cable 3300, the webbing 3503, and the twelfth fiber optic cable 3400. For example, FIG. 5A shows the third fiber optic cable 1300 inserted in the slot formed by the tenth fiber optic cable 3300, the twelfth fiber optic cable 3400 and the webbing 3503.

To form an interlocked bundle between the first bundled fiber cable 1000 and the third bundled cable 3000, the fiber optic cables of the first bundled fiber cable may be inserted into the slots of the third bundled fiber cable and vice versa.

For example, the first fiber optic cable 1100 may be inserted into the slot formed by the ninth fiber optic cable 3100, the tenth fiber optic cable 3200, and the webbing 1503; the second fiber optic cable 1200 may be inserted into the slot formed by the tenth fiber optic cable 3200, the eleventh fiber optic cable 3300, and the webbing 2503; and the third fiber optic cable 1300 may be inserted into the slot formed by the eleventh fiber optic cable 3300, the twelfth fiber optic cable 3400, and the webbing 3503. Further, the tenth fiber optic cable 3200 may be inserted into the slot formed by the first fiber optic cable 1100, the second fiber optic cable 1200, and the webbing 150; the eleventh fiber optic cable 3300 may be inserted into the slot formed by the second fiber optic cable 1200, the third fiber optic cable 1300, and the webbing 250; and the twelfth fiber optic cable 3400 may be inserted into the slot formed by the third fiber optic cable 1300, the fourth fiber optic cable 1400, and the webbing 350. Furthermore, at least one of the dielectric strength members of each of the fiber optic cables may align with other dielectric strength members of other fiber optic cables. For example, as shown in FIG. 5A, the dielectric strength members 1430, 3420, 1330, 3320, 1230, 3220, 1130, and 3120 may be in the same plane. This helps to improve the strength and stability of the interlocked bundle when the interlocked bundle is secured to utility poles. Moreover, the plurality of tabs and grooves located on the sheathing of each of the fiber optic cables may be removably connected to form a more secure interconnection as discussed in greater detail below with respect to FIG. 5B. Thus, an interlocked bundle is formed from the first bundled fiber cable 1000, the second bundled fiber cable 2000, and the third bundled fiber cable 3000.

Turning to FIG. 5B, an example of the interconnection between the plurality of tabs and grooves of two fiber optic cables is shown. In particular, FIG. 5B shows the eleventh fiber optic cable 3300 inserted into the slot formed by the second fiber optic cable 1200 (not shown), the webbing 250, and the third fiber optic cable 1300.

The eleventh fiber optic cable 3300 includes a plurality of fiber strands 3310, a first dielectric strength member 3320, a second dielectric strength member 3330, a first plurality of tabs and grooves 3340, a second plurality of tabs and grooves 3350, a third plurality of tabs and grooves 3360, and a fourth plurality of tabs and grooves 3370.

The third fiber optic cable 1300 includes a plurality of fiber strands 1310, a first dielectric strength member 1320, a second dielectric strength member 1330, a first plurality of tabs and grooves 1340, a second plurality of tabs and grooves 1350, a third plurality of tabs and grooves 1360, and a fourth plurality of tabs and grooves 1370.

Referring to FIG. 5B, the second plurality of tabs and grooves 1350 are interconnected with the third plurality of tabs and grooves 3360. That is, when the eleventh fiber optic cable 3300 is inserted into the slot formed by the second fiber optic cable 1200 (not shown), the webbing 250, and the third fiber optic cable 1300, the plurality of tabs and grooves located on each of the fiber optic cables interlock to provide a more secure connection between the bundled fiber optic cables. While FIG. 5B illustrates the use of tabs and grooves, different types of interconnecting techniques may be used, such as tongue and groove connections, interlocking pieces, male-female connections, etc.

Figure 6:
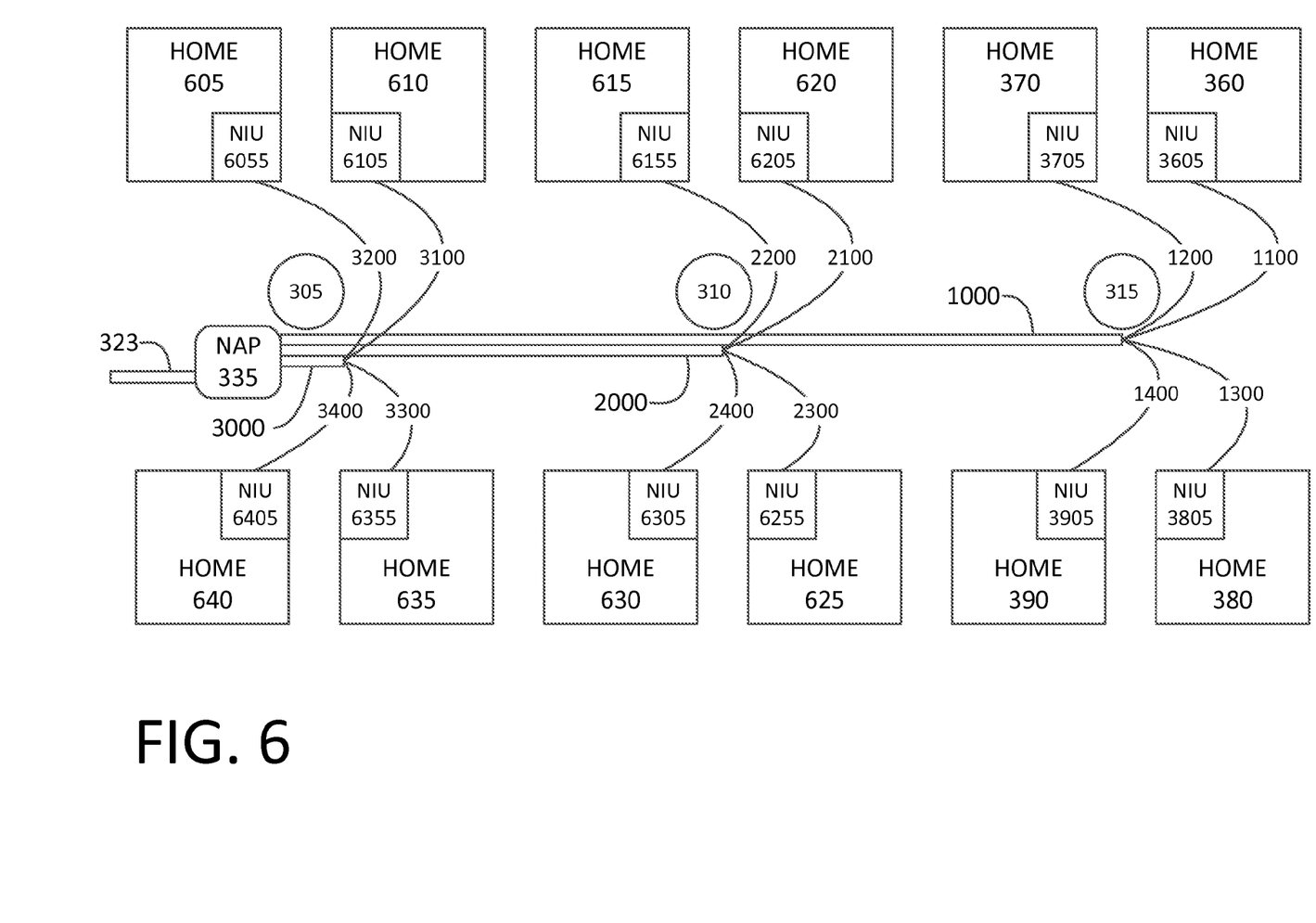
FIG. 6 shows an example of an installed interlocked bundle installed.

FIG. 6 illustrates an example of the interlocked bundle 5000 installed from a NAP 332 to several NIU in a manner similar to the one described above with respect to FIG. 3. FIG. 6 includes a first utility pole 305; a second utility pole 310; a third utility pole 315; and twelve houses (360, 370, 380, 390, 605, 610, 615, 620, 625, 630, 635, and 640). Each house may have a network interface unit (NIU) as shown by NIU 3605, 3705, 3805, 3905, 6055, 6105, 6155, 6205, 6255, 6305, 6355, and 6405.

A support strand and fiber optic cable 323 are connected to each of the first utility pole 305, the second utility pole 310, and the third utility pole 315 using known hardware. Additionally, a network access point (NAP) 335 may be connected to the support strand and fiber optic cable 323 or a utility pole via additional hardware.

For example, FIG. 6 shows the house 360 being farthest from the NAP 335. A first bundled fiber cable 1000 may be cut to a predetermined length from the NAP 335 to the NIU 3605. Next, a second bundled fiber cable 2000 may be cut to a length from the NAP 335 to the farthest house to be serviced by the second bundled fiber cable 2000, for example house 620. A third bundled fiber cable 3000 may be cut to a length from the NAP 335 to the house farthest from the NAP, for instance house 610. An interlocked bundle may be formed from the first bundled fiber cable 1000, the second bundled fiber cable 2000, and the third fiber cable 3000 according to one of the examples described above. After the interlocked bundle 5000 has been formed, the interlocked bundle 5000 may be secured to a support strand, utility poles, or any combination thereof.

After the securing the interlocked bundle 5000 to the utility poles, a technician may begin separating the fiber optic cables from the interlocked bundle to provide a communication channel between the NAP 335 and each of the NIUs. For example, the fourth fiber optic cable 1400 may be separated and may connect the NIU 3905 to the NAP 335 to provide a communication channel for the customer home 390. The process may be repeated for the remaining homes. For example, the fiber optic cable 1300 may be connected to the NIU 3805, the second fiber optic cable 1200 may be connected to the NIU 3705, and the first fiber optic cable 1100 may be connected to the NIU 3605.

The process may be repeated for the second bundled fiber cable 2000 and the third bundled fiber optic cable 3000. For example, the eighth fiber optic cable 2400 may be connected to the NIU 6305; the seventh fiber optic cable 2300 may be connected to the NIU 6255; and the sixth fiber optic cable 2200 and the fifth fiber optic cable 2100 may be connected to the NIU 6155 and 6205, respectively.

Likewise, the twelfth fiber optic cable 3400 may be connected to the NIU 6405; the eleventh fiber optic cable 3300 may be connected to the NIU 6355; the tenth fiber optic cable 3200 may be connected to the NIU 6055; and the ninth fiber optic cable 3100 may be connected to the NIU 6105 to provide communication channels to each of the homes 640, 635, 605 and 610.

While the examples described herein refer to fiber optic cables, one of ordinary skill in the art would recognize the applicability of the examples described herein to other types of cables, such as communication cables, coaxial cables, power cables, phone lines, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A fiber cable system comprising:
a first communication cable comprising a first sheathing;
a first tab and groove disposed on a first portion of the first sheathing;
a second communication cable comprising a second sheathing;
a second tab and groove disposed on a second portion of the second sheathing;
a member connecting the first sheathing to the second sheathing,
wherein the first and second tabs and grooves are each angled with respect to an axis extending between the first sheathing and the second sheathing; and
wherein the member, the first portion of the first sheathing and the second portion of the second sheathing form a slot, and wherein the slot is sized to receive a third communication cable having a third sheathing comprising at least a third tab and groove and a fourth tab and groove complementary to the first and second tabs and grooves, and wherein the first and second tabs and grooves of the first and second portions directly removably interlock with the third and fourth tabs and grooves of the third sheathing when the third communication cable is inserted in the slot.

2. The fiber cable system of claim 1, wherein the first communication cable further comprises:
at least one strength member configured to absorb stress to mitigate shearing of the fiber strands.

3. The fiber cable system of claim 2, further comprising at least two strength members, wherein the at least two strength members are disposed on either side of fiber strands.

4. The fiber cable system of claim 2, wherein the at least one strength member is a dielectric material.

5. The fiber cable system of claim 1, wherein the member connecting the first communication cable with the second communication cable allows for separation of the first communication cable from the bundled cable system.

6. A cable bundle comprising:
a first fiber bundle comprising:
a first fiber optic cable;
a second fiber optic cable;
a third fiber optic cable;
a first webbing attaching the first fiber optic cable to the second fiber optic cable along a first plane;
a second webbing attaching the second fiber optic cable to the third fiber optic cable along the first plane;
a first slot formed by the first fiber optic cable, the second fiber optic cable and the first webbing; and
a second slot formed by the second fiber optic cable, the third fiber optic cable, and the second webbing; and
a second fiber bundle comprising:
a fourth fiber optic cable;
a fifth fiber optic cable;
a third webbing attaching the fourth fiber optic cable to the fifth fiber optic cable along a second plane parallel to the first plane, and
a third slot formed by the fourth fiber optic cable, the fifth fiber optic cable, and the third webbing;
wherein the fourth fiber optic cable is directly inserted into the first slot, the second fiber optic cable is directly inserted into the third slot, and the fifth fiber optic cable is directly inserted into the second slot.

7. The cable bundle of claim 6, wherein the first fiber optic cable includes a first set of dielectric strength members located on either side of a first set of fiber strands.

8. The cable bundle of claim 7, wherein the second fiber optic cable includes a second set of dielectric strength members located on either side of a second set of fiber strands.

9. The cable bundle of claim 8, wherein the fourth fiber optic cable includes a fourth set of dielectric strength members located on either side of a fourth set of fiber strands.

10. The cable bundle of claim 9, wherein at least one of the first set of dielectric strength members and at least one of the second set of dielectric strength members aligns with at least one of the fourth set of dielectric members when the fourth fiber optic cable is inserted into the first slot.

11. A system comprising:
at least one network access point;
a plurality of network interface units;
a plurality of communication cables interconnecting the plurality of network interface units with the at least one network access point, at least a first, second, and third of the communication cables comprising a sheathing having curved tabs and grooves on a portion thereof; and
a member connecting at least the first and the second of the plurality of communication cables for at least a portion of the distance between the plurality of network interface units and at least one network access point, the member creating a slot between the first and second of the plurality of communication cables, the slot having a size and shape corresponding to the third of the plurality of communication cables such that the third communication cable is adapted to be removably inserted in the slot and the curved tabs and grooves of the third communication cable directly interlocking with the curved tabs and grooves of the first and second communication cables.

12. The system of claim 11, wherein each of the plurality of communication cables further comprises:
a plurality fiber strands disposed between a pair of strength members.

13. The system of claim 12, wherein the pair of strength members are made of a dielectric material.

14. The cable bundle of claim 6, wherein each of the first, second, and third fiber optic cables include a sheathing having a plurality of tabs and grooves, the plurality of tabs and grooves being angled with respect to the first plane along which the first and second webbing extend.

15. The cable bundle of claim 14, wherein each of the fourth and fifth fiber optic cables include a sheathing having tabs and grooves complementary to the tabs and grooves of the first, second, and third fiber optic cables.

16. The cable bundle of claim 15, wherein the tabs and grooves of the fourth fiber optic cable is configured to removably interlock with the tabs and grooves of the first and second fiber optic cables.

* * * * *